(12) United States Patent
Kennedy et al.

(10) Patent No.: US 11,142,596 B2
(45) Date of Patent: Oct. 12, 2021

(54) HIGH MOLECULAR WEIGHT POLYISOBUTYLENES AND POLYISOBUTYLENE NETWORKS FROM LIQUID POLYISOBUTYLENES BY THIOL-ENE CLICKING

(71) Applicants: Joseph Kennedy, Akron, OH (US); Turgut Nugay, Istanbul (TR); Nihan Nugay, Istanbul (TR)

(72) Inventors: Joseph Kennedy, Akron, OH (US); Turgut Nugay, Istanbul (TR); Nihan Nugay, Istanbul (TR)

(73) Assignee: The University of Akron, Akron, OH (US)

( * ) Notice: Subject to any disclaimer, the term of this patent is extended or adjusted under 35 U.S.C. 154(b) by 3 days.

(21) Appl. No.: 16/298,225

(22) Filed: Mar. 11, 2019

(65) Prior Publication Data
US 2020/0392268 A1 Dec. 17, 2020

(51) Int. Cl.
*C08F 210/10* (2006.01)
*C08K 5/3492* (2006.01)
*C08F 2/50* (2006.01)

(52) U.S. Cl.
CPC ............ *C08F 210/10* (2013.01); *C08F 2/50* (2013.01); *C08K 5/3492* (2013.01); *C08F 2810/40* (2013.01)

(58) Field of Classification Search
None
See application file for complete search history.

(56) References Cited

U.S. PATENT DOCUMENTS

| | | | |
|---|---|---|---|
| 2016/0002373 A1* | 1/2016 | Kennedy | C08G 75/14 525/333.9 |
| 2016/0009850 A1* | 1/2016 | Kennedy | C08F 8/26 522/127 |

FOREIGN PATENT DOCUMENTS

| | | | | |
|---|---|---|---|---|
| WO | WO-2018005416 A1 * | 1/2018 | | C08G 75/12 |
| WO | WO-2018204611 A1 * | 11/2018 | | A61L 27/58 |

OTHER PUBLICATIONS

Chouikhi et al. "Functionalized Polyisobutylene and Liquid/Liquid Separations as a Method for Scavenging Transition Metals from Homogeneously Catalyzed Reactions", Appl. Sci. 2019, 9, 120; doi:10.3390/app9010120 (Year: 2019).*

Sylvie Boileau, et al.; Reaction of functionalised thiols with oligoisobutenes via free-radical addition. Some new routes to thermoplastic crosslinkable polymers. Some new routes to thermoplastic crosslinkable polymers. European Polymer Journal 39 (2003) 1395-1404; www.elsevier.com/locate/europolj; 10 pages.

Andrew J.D. Magenau, et al.; Facile Polyisobutylene functionalization via thiol-ene click chemistry; Polym.Chem. 2010, 1, 831-833 / 831; www.rsc.org/polymers; 3 pages.

Alejandra Alvarez Albarran, et al.; Synthesis of functionalized polyisobutylenes using the propylene epoxide/TiCl4 initiating system; Polym Chem 2014, 5, 4710-4714; 5 pages.

Ute Gorski, et al.; Functionalized polyisobutenes by SH-en addition; 1997, Huthig & Wepf Verlag, Zug; Dec. 20, 1996; 14 pages.

Sandy P.S. Koo, et al.; Limitations of radical thiolene reactions for polymer-polymer conjugation: Journal of polymer science: Part A; Polymer Chemistry, vol. 48, 1699-1713; (2010); 15 pages.

Pieter Derboven, et al.; Kinetic modeling of radical thiol-ene chemistry for macromolecular design: Importance of side reactions and diffusional limitations; pubs.acs.org/Macromolecules; 2013 American Chemical Society; 11 pages.

Oskar Nuyken, et al.; New telechelic polymers and sequential copolymers by polyfunctional initiator-transfer agents (inifers) 9. A demonstration of chain extension of a polyisobutylene-diolefins with dithiols; Polymer Bulletin 4, 61-65 (1981); 5 pages.

* cited by examiner

*Primary Examiner* — Nicole M. Buie-Hatcher
(74) *Attorney, Agent, or Firm* — Renner, Kenner, Greive, Bobak, Taylor & Weber (57) ABSTRACT

A polyisobutylene-based polymer network comprising the thiol-ene reaction product of at least two thiol-terminated polyisobutylene precursor polymers and at least one multifunctional allyl-containing precursor moiety or polymer in the presence of light or heat. The at least two thiol-terminated polyisobutylene precursor polymers have at least two thiol end groups. When each polyisobutylene precursor polymer has only two thiol end groups then the allyl-containing precursor moiety or polymer has at least three functional groups, and wherein when the allyl-containing precursor moiety or polymer has two functional groups then each polyisobutylene precursor polymer has at least three thiol end groups.

15 Claims, 3 Drawing Sheets

HIGH MOLECULAR WEIGHT POLYISOBUTYLENES AND POLYISOBUTYLENE NETWORKS FROM LIQUID POLYISOBUTYLENES BY THIOL-ENE CLICKING

FIELD OF THE INVENTION

The present invention relates to polyisobutylene (PIB) networks. More particularly, the present invention relates to sulfur terminated linear PIBS and sulfur terminated star PIBS crosslinked with linear or star allyl-containing moieties or allyl-containing polymers. The preparation of these PIB networks is also provided.

BACKGROUND OF THE INVENTION

The preparation of polyisobutylene networks is generally known in the art. That is, by providing a functionalized end group to the ends of a polyisobutylene (PIB) polymer and reacting that functionalized end group with a compatible functional group that is present on or in a linking agent, a network of PIB polymers may be formed, connected by a linking segment resulting from the reacted linking agent. Oftentimes, the linking agent is itself a functionalized polymer other than PIB, such that the polymer networks are co-polymer networks.

When either the polyisobutylene or the linking agent has three or more functionalizations and the other of the polyisobutylene polymer and the linking agent has two or more functionalizations, it will be appreciated that non-linear polymer networks are formed. Such structures are defined herein as PIB networks. Such structures also fall within the definition of a polyisobutylene-based polymer network. However, again, not all polyisobutylene-based polymer networks are PIB networks. Thus, for purposes of this invention, the term "polyisobutylene-based polymer network" may be defined broadly as an aggregation of polyisobutylene polymers or segments that have been chemically linked to each other by various linking segments.

Such polyisobutylene-based networks are believed to have various uses, depending upon their nature. For example, some polyisobutylene (PIB)-based polymer networks are known to be useful as medical device coatings within the human body. Other PIB-based polymer networks are seen as useful for corrosion protection for metal and other surfaces. Still other PIB-based polymer networks are believed to provide excellent wound coatings for skin or provide excellent water repellent coatings for the skin or other surfaces.

However, many of the currently known PIB-based polymer networks are somewhat expensive to manufacture. Accordingly, providing new PIB-based polymer networks that are useful for one or more of the uses noted above, or any other desired uses, would be beneficial to several industries.

Accordingly, there is a need in the art for a simple and cost effective way to produce new PIB-based polymer networks. Novel PIB-based polymer networks are desired throughout several industries.

SUMMARY OF THE INVENTION

In general terms, the present invention relates to the formation of PIB networks by reacting sulfur terminated linear PIBS or sulfur terminated star PIBS with at least one multi-functional ally-containing moiety or polymer in the presence of light, such as UV light, or heat. It has been discovered that a thiol-ene click reaction can be readily employed for the preparation of PIB networks that are useful for medical device coatings within the human body, making corrosion resistant coatings for metal surfaces, and creating water-repellent wound dressings on living skin.

It is one aspect of the present invention to provide a polyisobutylene-based polymer network comprising the thiol-ene reaction product of at least two thiol-terminated polyisobutylene precursor polymers, each polyisobutylene precursor polymer having at least two thiol end groups; and at least one multi-functional allyl-containing precursor moiety or polymer, in the presence of light or heat; wherein when each polyisobutylene precursor polymer has only two thiol end groups then the allyl-containing precursor moiety or polymer has at least three functional groups, and wherein when the allyl-containing precursor moiety or polymer has two functional groups then each polyisobutylene precursor polymer has at least three thiol end groups.

It is one aspect of the present invention to provide a polyisobutylene-based polymer network that utilizes polyisobutylene precursor polymers that comprise a core and at least two polyisobutylene chains extending from the core, wherein each of the at least two polyisobutylene chains have a thiol end group.

It is one aspect of the present invention to provide a polyisobutylene-based polymer network that utilizes polyisobutylene precursor polymers having a formula selected from:

wherein m and m' are each an integer from 2 to 5,000, and when present m" is an interger from 2 to 5,000.

It is one aspect of the present invention to provide a polyisobutylene-based polymer network that utilizes multi-functional allyl-containing precursor moieties or polymers having a formula selected from:

wherein A represents an allyl group, M is a moiety and P is polymer.

It is one aspect of the present invention to provide a polyisobutylene-based polymer network that utilizes multi-functional allyl-containing precursor moiety having the formula It is one aspect of the present invention to provide a polyisobutylene-based polymer network that utilizes multi-functional allyl-containing precursor polymers wherein the polymers have the formula wherein P is a polyisobutylene polymer.

It is another aspect of the present invention to provide a polyisobutylene-based polymer network comprising at least two sulfur containing polyisobutylene polymer segments and at least one residue of an allyl-containing moiety or polymer, wherein the at least two sulfur containing polyisobutylene polymer segments each include a core and at least two polyisobutylene polymer chains extending therefrom and including at least one sulfur atom being attached to the residue of the allyl-containing moiety or polymer, the residue of the allyl-containing moiety or polymer connecting the at least two sulfur containing polyisobutylene polymer segments together.

It is one aspect of the present invention to provide a polyisobutylene-based polymer network that has the formula:

wherein $n$, $n'$, $n''$, and $n'''$ are each an integer from 2 to 5,000, and wherein each represents a polyisobutylene

In yet another aspect, the present invention provides a method for creating a polyisobutylene-based polymer network, the method comprising providing at least two thiol-terminated polyisobutylene precursor polymers, each polyisobutylene precursor polymer having at least two thiol end groups; adding at least one multi-functional allyl-containing precursor moiety or polymer with the at least two polyisobutylene precursor polymers to form a mixture; and irradiating the mixture with light or heat, so as to provide a thiol-ene reaction, thereby producing the polyisobutylene-based polymer network.

It is one aspect of the present invention to provide a method for creating a polyisobutylene-based polymer network that utilizes polyisobutylene precursor polymers comprising an initiator core and at least two polyisobutylene chains extending from the initiator core, wherein each of the at least two polyisobutylene chains have a thiol end group.

It is one aspect of the present invention to provide a method for creating a polyisobutylene-based polymer network that utilizes a polyisobutylene precursor polymer having the formula selected from:

wherein m and m' are each an integer from 2 to 5,000, and when present m" is an integer from 2 to 5,000.

It is one aspect of the present invention to provide a method for creating a polyisobutylene-based polymer network that utilizes multi-functional allyl-containing precursor moieties or polymers having a formula selected from:

wherein A represents an allyl group, M is a moiety and P is polymer.

It is one aspect of the present invention to provide a method for creating a polyisobutylene-based polymer network that utilizes a multi-functional allyl-containing precursor moiety having the formula It is one aspect of the present invention to provide a method for creating a polyisobutylene-based polymer network that utilizes multi-functional allyl-containing precursor polymers wherein the polymers have the formula wherein P is polyisobutylene polymer.

It is one aspect of the present invention to provide a method for creating a polyisobutylene-based polymer network wherein the step of irradiating includes heating the mixture in the presence of a free radical initiator to produce the polymer network.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

The present invention generally relates to polyisobutylene (PIB) networks. It will be appreciated that it is an important aspect of the present invention that the sulfur containing segments of the formed polyisobutylene networks are introduced by the use of sulfur terminated linear PIBs or sulfur terminated star PIBs. The preparation of these PIB networks is also provided. Such a polyisobutylene network can be used, for example, for making corrosion resistant coatings for metal surfaces and water-repellent wound dressings on living skin.

Under carefully controlled conditions, the thiol-ene "click" reaction, as shown below in Scheme 1 will proceed to essentially quantitative conversions under mild conditions.

Scheme 1

In one embodiment of the present invention, thiol-terminated polyisobutylene precursor polymers must be prepared. The preparation and characterization of hydroxyl telechelic polyisobutylene (HO-PIB-OH) have been previously described in International Patent Publication No. WO2010039986 by Kennedy et al., the contents of which are herein incorporated by reference.

Once prepared, the HO—PIB-OH must be end-capped with a thiol. In one or more embodiments of the present invention, the thiol is 3-mercaptopropionic acid (MPA). The HO-PIB-OH is end-capped by the addition of the HO-PIB-OH and the thiol in a solvent such as toluene. The solution is then heated to a temperature of about 50° C. The next step in the process is to add a sulfonic acid into the system and then heat the system to a temperature of about 130° C. overnight in a distillation device such as a Dean and Stark apparatus. In one or more embodiments of the present invention, the sulfonic acid is p-toluenesulfonic acid. The next day the formed polymer is precipitated in 0.5 L of a solvent such as methanol, the solvent is decanted, and then dried in vacuum at a temperature of about 30° C.

In some embodiments, the thiol-terminated polyisobutylene precursor polymer formed from the process above has the formula:

wherein m and m' are each an integer from 2 to 5,000.

In some embodiments, the thiol-terminated polyisobutylene precursor polymer formed from the process above has the formula:

wherein m, m' n" are each an integer from 2 to 5,000.

Once the thiol-terminated polyisobutylene precursor polymers have been formed, in one embodiment of the present invention, the next step in the process is to take the thiol-terminated polyisobutylene precursor polymer and form a polyisobutylene-based polymer network. This is done by adding an allyl-containing precursor moiety or polymer to the already formed thiol-terminated polyisobutylene precursor polymer and then either irradiated with ultra violet light in the presence of a catalyst or heating in the presence of a radical initiator.

In one embodiment of the present invention, the allyl-containing precursor moiety or polymer has a formula selected from:

wherein A represents an allyl group, M is a moiety and P is polymer. In one embodiment of the present invention, the allyl-containing precursor moiety is 1,3,5-triallyl-1,3,5-triazine-2,4,6(1H,3H,5H)-trione (TATA). In one embodiment of the present invention, the polymer segment in the allyl-containing precursor polymer is a polyisobutylene polymer.

As will be appreciated by those of skill in the art, the thiol-ene "click" reactions used herein may be initiated in at least two ways. In some embodiments, a photochemical reaction is used. In these embodiments, a suitable catalyst is added to the solution, and then the solution is irradiated with ultraviolet light to initiate the reaction. Any catalyst known in the art for use with UV light-activated thiol-ene reactions may be used and one of ordinary skill in the art will be able to select a suitable catalyst without undue experimentation. In some embodiments, the catalyst is 2,2-dimethoxy-2-phenyl acetophenone (DMPA).

Next the solution is irradiated with ultraviolet (UV) light to activate the thiol-ene reaction. In some embodiments, the solution may be irradiated with UV light using a medium pressure Hg lamp as the UV source. The exact reaction parameters will depend upon the particular materials being reacted and is well within the ability of one of ordinary skill in the art to determine without undue experimentation. In some embodiments, solution may be irradiated with UV light using a medium pressure Hg lamp for 60 min at from about 0° C. to about 5° C. to complete the reaction.

Alternatively, a radical initiator is added to the solution, and then the solution is heated to initiate the reaction. Any radical initiator known in the art for use with UV light-activated thiol-ene reactions may be used and one of ordinary skill in the art will be able to select a suitable radical initiator without undue experimentation. The exact reaction parameters will depend upon the particular materials being reacted and is well within the ability of one of ordinary skill in the art to determine without undue experimentation. In some embodiments, the solution may be heated to initiate the reaction.

By way of example, Scheme 2 below shows the structures of the starting materials and the network obtained when a thiol-terminated polyisobutylene precursor polymer is cross-linked with at least one multi-functional allyl-containing precursor moiety and exposed to UV radiation (or heat in the presence of a radical initiator) according to at least one embodiment of the present invention.

Scheme 2

HO-PIB-OH

In one or more embodiments of the present invention, it is important to note that although it is envisioned that the polyisobutylene-based polymer networks of the present invention can be made with at least two thiol-terminated polyisobutylene precursor polymers each having at least two thiol end groups and at least one multi-functional allyl-containing precursor moiety or polymer, there are some limits to the number of thiol end groups on the thiol-terminated polyisobutylene precursor polymers and the number of functional groups on the at least one multi-functional allyl-containing precursor moiety or polymer used to make the networks. For example, when each polyisobutylene precursor polymer has only two thiol end groups, then the allyl-containing precursor moiety or polymer has to have at least three functional groups. Additionally, when the allyl-containing precursor moiety or polymer has exactly two functional groups, then each polyisobutylene precursor polymer has to have at least three thiol end groups. The limitations on the number of thiol end groups on the thiol-terminated polyisobutylene precursor polymers and the number of functional groups on the at least one multi-functional allyl-containing precursor moiety or polymer used to make the networks is in place to ensure that no linear polymer networks are formed.

Experiments were also done so as to compare the polyisobutylene-based polymer networks of the present invention made with the at least two thiol-terminated polyisobutylene precursor polymers each having at least two thiol end groups and the at least one multi-functional allyl-containing precursor moiety or polymer, symbolized as PIB-SXA with prior art polyisobutylene-based polymer networks prepared with allyl-terminated polyisobutylene precursor moieties and at least one multi-functional thiol, symbolized as PIB-AXS.

Figure 1:
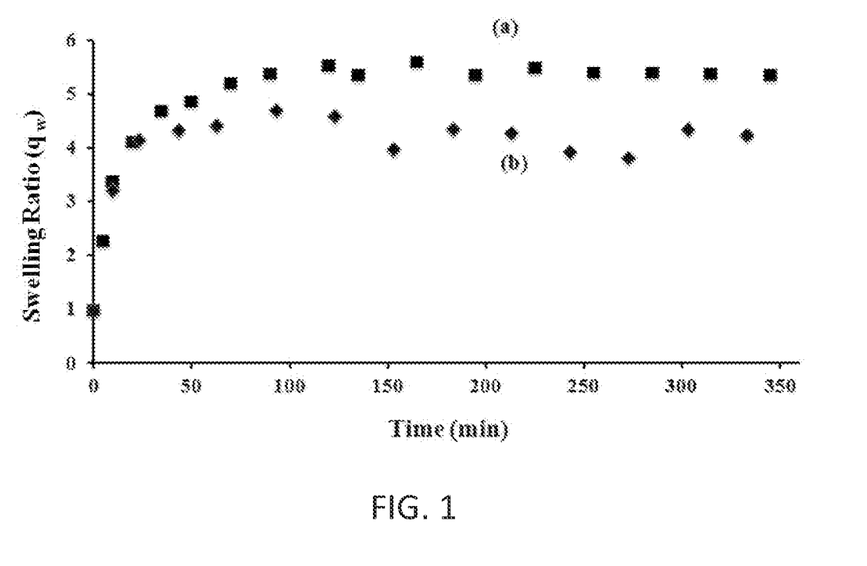
FIG. 1. is graph of the swelling ratio versus time for a) PIB-AXS and b) PIB-SXA.

Swelling experiments yield valuable information of network characteristics. FIG. 1 shows swelling of PIB-AXS and PIB-SXA in cyclohexane, which is a good solvent for polyisobutylene as a function of time, and Table 1 below summarizes average molecular weight between crosslinks ($M_e$), equilibrium swelling ratio ($q_w$), crosslink density ($\rho_c$), mesh size ($\xi$), and extractables %.

TABLE 1

| Network | $M_c$ (g/mol) | $q_w$ | $\rho_c$ (×10⁻⁴) | ξ (nm) | Extractables (%) | Visual observations |
|---|---|---|---|---|---|---|
| PIB-AXS | 1141 | 5.35 | 7.96 | 5.28 | 17.8 | Optically clear, tacky, weak film |
| PIB-SXA | 890 | 4.00 | 10 | 4.15 | 10.0 | Optically clear, Non-tacky, strong film |

Figure FIG. 1 shows that PIB-AXS swells to about 535% and that PIB-SXA swells to about 400% within an 1 hour and 25 minutes. This data indicates about 4 grams of cyclohexane per one gram of the network gel which indicates rather tightly crosslinked networks. The higher crosslink density, $\rho_c$, lower swelling ratio, $q_w$, and lower mesh size, ξ, indicate higher crosslinking efficiency of PIB-SXA as compared to PIB-AXS. It is believed that this occurs because the thiol-ene click reaction occurs easily and efficiently between the polyisobutylene precursor polymers and the multi-functional allyl-containing precursor moiety or polymer. The absence of tackiness and unpleasant odor after crosslinking is likely due to complete thiol conversion. PIB-AXS and PIB-SXA produced 17.8 and 10.0 wt. % extractables (i.e., 82.2 and 90% gel), respectively. This data also indicates high thiol-ene conversions.

It has been discovered that the preparation of polyisobutylene networks synthesized with thiol-terminated polyisobutylene precursor polymers and multi-functional allyl-containing precursor moieties or polymers will produce optically clear odorless non-tacky strong network films exhibiting essentially no creep (less than 1% permanent set.

EXAMPLES

The following examples are offered to more fully illustrate the invention, but are not to be construed as limiting the scope thereof. Further, while some of examples may include conclusions about the way the invention may function, the inventors do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Synthesis of Thiol Telechelic PIB (HS-PIB-SH)

Hydroxyl terminated polyisobutylene (HO-PIB-OH) is first end capped with 3-mercaptopropionic acid (MPA). Thus, HO-PIB-OH (7.5 g, 2.4 mmol) and MPA (2.7 g, 23 mmol) were dissolved in 120 ml of toluene and the solution was heated to 50° C. Then, 0.033 g (0.17 mmol) of p-toluenesulfonic acid (p-TSA) was added, and then the system was stirred at 130° C. overnight in a Dean and Stark apparatus. The formed polymer was precipitated in 0.5 L of methanol, the solvent was then decanted, and then dried in a vacuum at 30° C. The product was characterized by ¹H NMR spectroscopy and GPC.

Figure 2A:
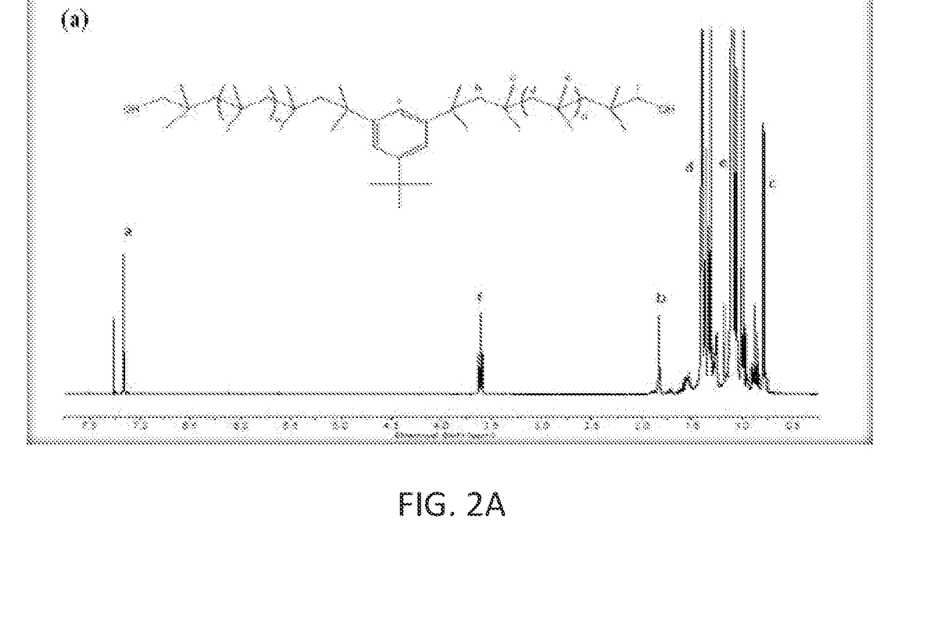
FIG. 2A is a $^1$H NMR spectrum of a hydroxyl terminated polyisobutylene.
Figure 2B:
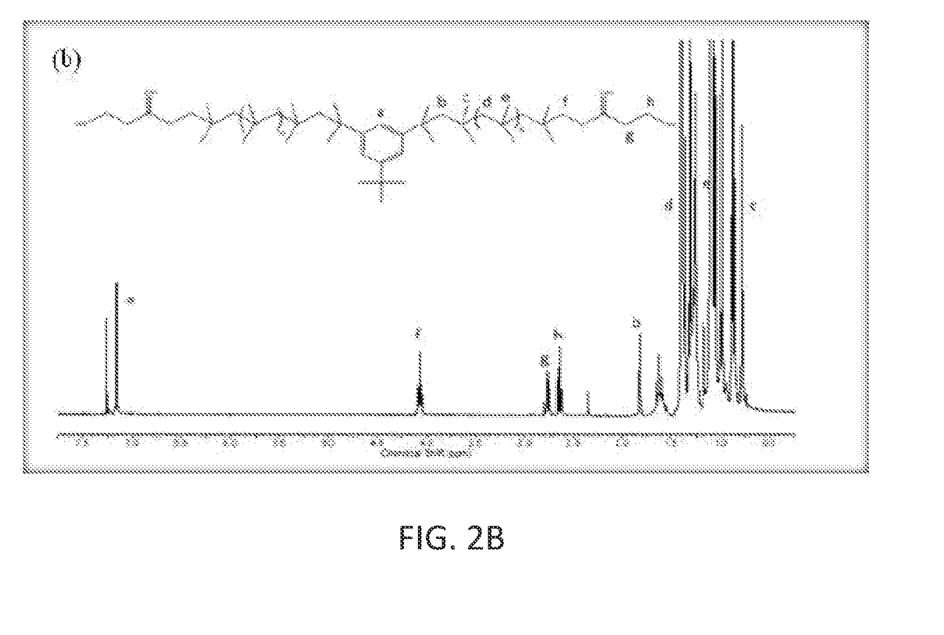
FIG. 2B is a $^1$H NMR spectrum of a thiol terminated polyisobutylene.
Figure 3:
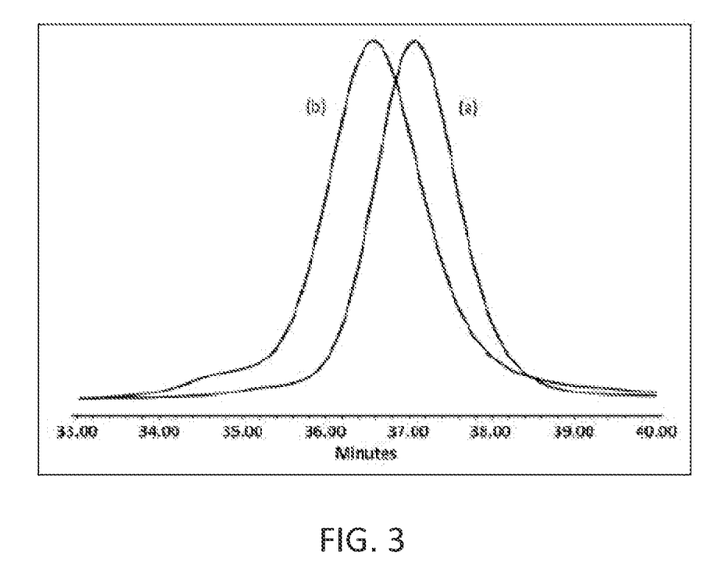
FIG. 3 shows the GPC traces of a) a hydroxyl terminated polyisobutylene and b) a thiol terminated polyisobutylene.

As shown in FIG. 2A, ¹H NMR spectroscopy indicated essentially complete functionalization. Thus, the resonance at 3.6 ppm associated with the —CH₂OH proton of the starting material disappeared, while a resonance at 4.2 ppm indicating the ester of the target product appeared as shown in FIG. 2B. FIG. 3 shows the GPC traces of the starting material and that of the product were monomodal and indicated a Mn of HO-PIB-OH of 3180 g/mol and the Mn of SH-PIB-SH was 3750 g/mol, with a Mw/Mn of 1.06 for the HO-PIB-OH and a Mw/Mn of 1.1 for the SH-PIB-SH.

Example 2

Crosslinking of HS-PIB-SH with Triallyl Triazine 1,3,5-triallyl-1,3,5-triazine-2,4,6(1H,3H,5H)-trione (TATA) (0.039 g, 1.56×10⁻⁴ mol) was added to HS-PIB-SH (0.583 g, 1.56×10⁻⁴ mol) along with 2,2-dimethoxy-2-phenylacetophenone (DMPA) initiator (0.04 g, 1.6×10⁻⁴ mol) dissolved in THF under vigorous mixing and the solution was quickly poured into a Teflon mold. The void-free solution was illuminated with UV light for one hour. Subsequently, network films were dried overnight in vacuum at 30° C. and postcured for 30 additional minutes.

Figure 4:
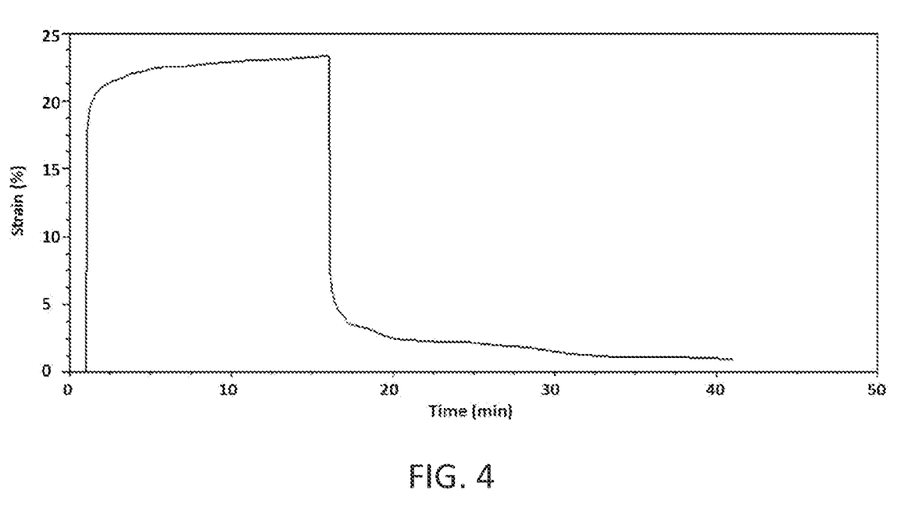
FIG. 4 is a graph of a creep experiment showing strain percentage versus time for PIB-SXA.

PIB-SXA prepared with HS-PIB-SH and TATA produced an odorless non-tacky strong film on manual examination. A deformation experiment also indicated behavior typical of a strong elastomer. FIG. 4 shows the result of a representative creep experiment. Thus, after 15 minutes of force applied at room temperature, deformation was ~22%; after removing the force the sample recovered very rapidly with less than 1% permanent deformation. This is a characteristic of a strong rubber.

In light of the foregoing, it should be appreciated that the present invention significantly advances the art by providing polyisobutylene networks synthesized with thiol-terminated polyisobutylene precursor polymers and multi-functional allyl-containing precursor moieties or polymers that are structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A polyisobutylene-based polymer network comprising the thiol-ene reaction product of:
   at least two thiol-terminated polyisobutylene precursor polymers, each polyisobutylene precursor polymer having at least two thiol end groups; and
   at least one multi-functional allyl-containing precursor moiety or polymer, in the presence of light or heat;
   wherein when each polyisobutylene precursor polymer has only two thiol end groups then the allyl-containing precursor moiety or polymer has at least three functional groups, and wherein when the allyl-containing precursor moiety or polymer has two functional groups then each polyisobutylene precursor polymer has at least three thiol end groups.

2. The polyisobutylene-based polymer network of claim 1 wherein each polyisobutylene precursor polymer comprises a core and at least two polyisobutylene chains extending from the core, wherein each of the at least two polyisobutylene chains have a thiol end group.

3. The polyisobutylene-based polymer network of claim 1, wherein each polyisobutylene precursor polymer has a formula selected from:

wherein m and m' are each an integer from 2 to 5,000, and when present, m" is an integer from 2 to 5,000.

4. The polyisobutylene-based polymer network of claim 1, wherein the at least one multi-functional allyl-containing precursor moiety or polymer has a formula selected from:

wherein A represents an allyl group, M is a moiety and P is polymer.

5. The polyisobutylene-based polymer network of claim 4 wherein the at least one multi-functional allyl-containing precursor moiety is an moiety represented by the specific formula

6. The polyisobutylene-based polymer network of claim 4 wherein the polymer is polyisobutylene.

7. A polyisobutylene-based polymer network comprising at least two sulfur containing polyisobutylene polymer segments and at least one residue of an allyl-containing moiety or polymer, wherein the at least two sulfur containing polyisobutylene polymer segments each include a core and at least two polyisobutylene polymer chains extending therefrom and including at least one sulfur atom being attached to the residue of the allyl-containing moiety or polymer, the residue of the allyl-containing moiety or polymer connecting the at least two sulfur containing polyisobutylene polymer segments together.

8. The polyisobutylene-based polymer network of claim 7 having the formula:

wherein n, n', n", and n'" are each an integer from 2 to 5,000 and wherein each ⁓ represents a polyisobutylene chain.

9. A method for creating a polyisobutylene-based polymer network, the method comprising:
providing at least two thiol-terminated polyisobutylene precursor polymers, each polyisobutylene precursor polymer having at least two thiol end groups;
adding at least one multi-functional allyl-containing precursor moiety or polymer with the at least two polyisobutylene precursor polymers to form a mixture;
wherein when each polyisobutylene precursor polymer has only two thiol end groups then the allyl-containing precursor moiety or polymer has at least three functional groups, and wherein when the allyl-containing precursor moiety or polymer has two functional groups then each polyisobutylene precursor polymer has at least three thiol end groups; and
irradiating the mixture with light or heating the mixture, so as to provide a thiol-ene reaction, thereby producing the polyisobutylene-based polymer network.

10. The method of claim 9, wherein each polyisobutylene precursor polymer comprises an initiator core and at least two polyisobutylene chains extending from the initiator core, wherein each of the at least two polyisobutylene chains have a thiol end group.

11. The method of claim 9, wherein each polyisobutylene precursor polymer has a formula selected from:

wherein m and m' are each an integer from 2 to 5,000, and when present, m" is an integer from 2 to 5,000.

12. The method of claim 9, wherein the at least one multi-functional allyl-containing precursor moiety or polymer is selected from a formula selected from:

wherein A represents an allyl group, M is a moiety and P is polymer.

13. The method of claim 12 wherein the at least one multi-functional allyl-containing precursor moiety is an moiety represented by the specific formula 14. The method of claim 12 wherein the polymer is polyisobutylene.

15. The method of claim 9, wherein the step of irradiating includes heating the mixture in the presence of a free radical initiator to produce the polymer network.

* * * * *